(12) United States Patent
Wang et al.

(10) Patent No.: US 10,938,788 B2
(45) Date of Patent: Mar. 2, 2021

(54) STATIC ROUTES FOR POLICY-BASED VPN

(71) Applicant: VMware, Inc., Palo Alto, CA (US)

(72) Inventors: Yong Wang, Sunnyvale, CA (US);
Xinhua Hong, Milpitas, CA (US);
David J. Leroy, Palo Alto, CA (US);
Kai-Wei Fan, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 267 days.

(21) Appl. No.: 16/218,433

(22) Filed: Dec. 12, 2018

(65) Prior Publication Data
US 2020/0195607 A1 Jun. 18, 2020

(51) Int. Cl.
*H01L 29/06* (2006.01)
*H04L 29/06* (2006.01)
(Continued)

(52) U.S. Cl.
CPC ............ *H04L 63/029* (2013.01); *H04L 12/66* (2013.01); *H04L 41/0803* (2013.01);
(Continued)

(58) Field of Classification Search
CPC ............. H04L 63/0236; H04L 63/0272; H04L 63/029; H04L 63/0485; H04L 63/20;
(Continued)

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| CN | 1442987 A | 9/2003 |
| CN | 1714548 A | 12/2005 |

(Continued)

OTHER PUBLICATIONS

Non-Published commonly Owned U.S. Appl. No. 16/447,939, filed Jun. 20, 2019, 37 pages, Nicira, Inc.
(Continued)

*Primary Examiner* — Eric W Shepperd
(74) *Attorney, Agent, or Firm* — Adeli LLP

(57) ABSTRACT

Some embodiments provide a method for configuring a gateway datapath that processes data messages between a logical network implemented in a datacenter and an external network. The method receives configuration data including security policy rules for a logical router implemented by the datapath that indicate whether to apply a security protocol to certain data messages transmitted from a particular interface of the logical router. The method identifies a particular security policy rule that applies to data messages that (i) have a destination address in a set of destination addresses and (ii) meet at least one additional criteria. The method generates a static route, for a routing table used by the datapath to implement the logical router, that routes data messages with destination addresses in the set of destination addresses to the particular interface. The datapath applies the security policy rules for data messages transmitted from the particular interface.

20 Claims, 6 Drawing Sheets

(51) Int. Cl.
*H04L 12/751* (2013.01)
*H04L 12/66* (2006.01)
*H04L 12/24* (2006.01)
*H04L 12/741* (2013.01)

(52) U.S. Cl.
CPC .......... *H04L 41/0893* (2013.01); *H04L 45/02* (2013.01); *H04L 45/745* (2013.01); *H04L 63/0236* (2013.01); *H04L 63/0272* (2013.01); *H04L 63/0485* (2013.01); *H04L 63/20* (2013.01)

(58) Field of Classification Search
CPC ....... H04L 45/34; H04L 45/72; H04L 45/745; H04L 41/0803; H04L 12/66
See application file for complete search history.

(56) References Cited

U.S. PATENT DOCUMENTS

| | | | |
|---|---|---|---|
| 5,751,967 | A | 5/1998 | Raab et al. |
| 6,006,275 | A | 12/1999 | Picazo et al. |
| 6,104,699 | A | 8/2000 | Holender et al. |
| 6,219,699 | B1 | 4/2001 | McCloghrie et al. |
| 6,359,909 | B1 | 3/2002 | Ito et al. |
| 6,456,624 | B1 | 9/2002 | Eccles et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,785,843 | B1 | 8/2004 | McRae et al. |
| 6,914,907 | B1 | 7/2005 | Bhardwaj et al. |
| 6,941,487 | B1 | 9/2005 | Balakrishnan et al. |
| 6,950,428 | B1 | 9/2005 | Horst et al. |
| 6,963,585 | B1 | 11/2005 | Pennec et al. |
| 6,999,454 | B1 | 2/2006 | Crump |
| 7,046,630 | B2 | 5/2006 | Abe et al. |
| 7,107,356 | B2 | 9/2006 | Baxter et al. |
| 7,197,572 | B2 | 3/2007 | Matters et al. |
| 7,200,144 | B2 | 4/2007 | Terrell et al. |
| 7,209,439 | B2 | 4/2007 | Rawlins et al. |
| 7,260,648 | B2 | 8/2007 | Tingley et al. |
| 7,283,473 | B2 | 10/2007 | Arndt et al. |
| 7,342,916 | B2 | 3/2008 | Das et al. |
| 7,391,771 | B2 | 6/2008 | Orava et al. |
| 7,447,197 | B2 | 11/2008 | Terrell et al. |
| 7,450,598 | B2 | 11/2008 | Chen et al. |
| 7,463,579 | B2 | 12/2008 | Lapuh et al. |
| 7,478,173 | B1 | 1/2009 | Delco |
| 7,483,411 | B2 | 1/2009 | Weinstein et al. |
| 7,555,002 | B2 | 6/2009 | Arndt et al. |
| 7,606,260 | B2 | 10/2009 | Oguchi et al. |
| 7,630,358 | B1 | 12/2009 | Lakhani et al. |
| 7,643,488 | B2 | 1/2010 | Khanna et al. |
| 7,649,851 | B2 | 1/2010 | Takashige et al. |
| 7,653,747 | B2 | 1/2010 | Lucco et al. |
| 7,710,874 | B2 | 5/2010 | Balakrishnan et al. |
| 7,742,459 | B2 | 6/2010 | Kwan et al. |
| 7,764,599 | B2 | 7/2010 | Doi et al. |
| 7,778,268 | B2 | 8/2010 | Khan et al. |
| 7,792,097 | B1 * | 9/2010 | Wood ...................... H04L 45/00 370/352 |
| 7,792,987 | B1 | 9/2010 | Vohra et al. |
| 7,802,000 | B1 | 9/2010 | Huang et al. |
| 7,818,452 | B2 | 10/2010 | Matthews et al. |
| 7,826,482 | B1 | 11/2010 | Minei et al. |
| 7,839,847 | B2 | 11/2010 | Nadeau et al. |
| 7,885,276 | B1 | 2/2011 | Lin |
| 7,936,770 | B1 | 5/2011 | Frattura et al. |
| 7,937,438 | B1 | 5/2011 | Miller et al. |
| 7,948,986 | B1 | 5/2011 | Ghosh et al. |
| 7,953,865 | B1 | 5/2011 | Miller et al. |
| 7,987,506 | B1 * | 7/2011 | Khalid ................. H04L 63/0272 726/15 |
| 7,991,859 | B1 | 8/2011 | Miller et al. |
| 7,995,483 | B1 | 8/2011 | Bayar et al. |
| 8,027,260 | B2 | 9/2011 | Venugopal et al. |
| 8,027,354 | B1 | 9/2011 | Portolani et al. |
| 8,031,633 | B2 | 10/2011 | Bueno et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,131,852 | B1 | 3/2012 | Miller et al. |
| 8,149,737 | B2 | 4/2012 | Metke et al. |
| 8,155,028 | B2 | 4/2012 | Abu-Hamdeh et al. |
| 8,166,201 | B2 | 4/2012 | Richardson et al. |
| 8,194,674 | B1 | 6/2012 | Pagel et al. |
| 8,199,750 | B1 | 6/2012 | Schultz et al. |
| 8,223,668 | B2 | 7/2012 | Allan et al. |
| 8,224,931 | B1 | 7/2012 | Brandwine et al. |
| 8,224,971 | B1 | 7/2012 | Miller et al. |
| 8,239,572 | B1 | 8/2012 | Brandwine et al. |
| 8,259,571 | B1 | 9/2012 | Raphel et al. |
| 8,265,075 | B2 | 9/2012 | Pandey |
| 8,281,067 | B2 | 10/2012 | Stolowitz |
| 8,312,129 | B1 | 11/2012 | Miller et al. |
| 8,339,959 | B1 | 12/2012 | Moisand et al. |
| 8,339,994 | B2 | 12/2012 | Gnanasekaran et al. |
| 8,345,650 | B2 | 1/2013 | Foxworthy et al. |
| 8,351,418 | B2 | 1/2013 | Zhao et al. |
| 8,370,834 | B2 | 2/2013 | Edwards et al. |
| 8,416,709 | B1 | 4/2013 | Marshall et al. |
| 8,456,984 | B2 | 6/2013 | Ranganathan et al. |
| 8,504,718 | B2 | 8/2013 | Wang et al. |
| 8,559,324 | B1 | 10/2013 | Brandwine et al. |
| 8,565,108 | B1 | 10/2013 | Marshall et al. |
| 8,600,908 | B2 | 12/2013 | Lin et al. |
| 8,611,351 | B2 | 12/2013 | Gooch et al. |
| 8,612,627 | B1 | 12/2013 | Brandwine |
| 8,625,594 | B2 | 1/2014 | Sakai et al. |
| 8,625,603 | B1 | 1/2014 | Ramakrishnan et al. |
| 8,625,616 | B2 | 1/2014 | Vobbilisetty et al. |
| 8,627,313 | B2 | 1/2014 | Edwards et al. |
| 8,644,188 | B1 | 2/2014 | Brandwine et al. |
| 8,660,129 | B1 | 2/2014 | Brendel et al. |
| 8,705,513 | B2 | 4/2014 | Merwe et al. |
| 8,724,456 | B1 | 5/2014 | Hong et al. |
| 8,745,177 | B1 * | 6/2014 | Kazerani ............ H04L 41/5067 709/220 |
| 8,958,298 | B2 | 2/2015 | Zhang et al. |
| 9,021,066 | B1 | 4/2015 | Singh et al. |
| 9,032,095 | B1 | 5/2015 | Traina et al. |
| 9,036,639 | B2 | 5/2015 | Zhang |
| 9,059,999 | B2 | 6/2015 | Koponen et al. |
| 9,137,052 | B2 | 9/2015 | Koponen et al. |
| 9,313,129 | B2 | 4/2016 | Ganichev et al. |
| 9,419,855 | B2 | 8/2016 | Ganichev et al. |
| 9,485,149 | B1 | 11/2016 | Traina et al. |
| 9,503,321 | B2 | 11/2016 | Neginhal et al. |
| 9,559,980 | B2 | 1/2017 | Li et al. |
| 9,647,883 | B2 | 5/2017 | Neginhal et al. |
| 9,749,214 | B2 | 8/2017 | Han |
| 9,787,605 | B2 | 10/2017 | Zhang et al. |
| 10,057,157 | B2 | 8/2018 | Goliya et al. |
| 10,075,363 | B2 | 9/2018 | Goliya et al. |
| 10,079,779 | B2 | 9/2018 | Zhang et al. |
| 10,095,535 | B2 | 10/2018 | Dubey et al. |
| 10,110,431 | B2 | 10/2018 | Ganichev et al. |
| 10,129,142 | B2 | 11/2018 | Goliya et al. |
| 10,129,180 | B2 | 11/2018 | Zhang et al. |
| 10,153,973 | B2 | 12/2018 | Dubey |
| 10,230,629 | B2 | 3/2019 | Masurekar et al. |
| 10,270,687 | B2 | 4/2019 | Mithyantha |
| 10,341,236 | B2 | 7/2019 | Boutros et al. |
| 10,382,321 | B1 | 8/2019 | Boyapati et al. |
| 10,411,955 | B2 | 9/2019 | Neginhal et al. |
| 10,454,758 | B2 | 10/2019 | Boutros et al. |
| 10,601,700 | B2 | 3/2020 | Goliya et al. |
| 10,623,322 | B1 * | 4/2020 | Nallamothu ............ H04L 47/20 |
| 10,700,996 | B2 | 6/2020 | Zhang et al. |
| 10,749,801 | B2 | 8/2020 | Dubey |
| 10,795,716 | B2 | 10/2020 | Dubey et al. |
| 10,797,998 | B2 | 10/2020 | Basavaraj et al. |
| 10,805,212 | B2 | 10/2020 | Masurekar et al. |

(56) References Cited

U.S. PATENT DOCUMENTS

| | | |
|---|---|---|
| 2001/0043614 A1 | 11/2001 | Viswanadham et al. |
| 2002/0067725 A1 | 6/2002 | Oguchi et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0067924 A1 | 4/2003 | Choe et al. |
| 2003/0069972 A1 | 4/2003 | Yoshimura et al. |
| 2004/0013120 A1 | 1/2004 | Shen |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0050719 A1* | 3/2006 | Barr .................. H04L 45/00 370/401 |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0165515 A1 | 7/2007 | Vasseur |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0262741 A1* | 10/2009 | Jungck ............... H04L 61/1511 370/392 |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0060940 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0208621 A1 | 8/2013 | Manghirmalani et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0146817 A1 | 5/2014 | Zhang |
| 2014/0173093 A1 | 6/2014 | Rabeela et al. |

(56) References Cited

U.S. PATENT DOCUMENTS

| | | |
|---|---|---|
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0009831 A1* | 1/2015 | Graf .................. H04L 47/31 370/236 |
| 2015/0016300 A1 | 1/2015 | Devireddy et al. |
| 2015/0063360 A1 | 3/2015 | Thakkar et al. |
| 2015/0063364 A1 | 3/2015 | Thakkar et al. |
| 2015/0089082 A1 | 3/2015 | Patwardhan et al. |
| 2015/0092594 A1 | 4/2015 | Zhang et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1* | 9/2015 | Ganichev .......... H04L 41/0806 370/254 |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2015/0299880 A1 | 10/2015 | Jorge et al. |
| 2016/0105471 A1 | 4/2016 | Nunes et al. |
| 2016/0119229 A1 | 4/2016 | Zhou |
| 2016/0182287 A1 | 6/2016 | Chiba et al. |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0261493 A1 | 9/2016 | Li |
| 2016/0294612 A1 | 10/2016 | Ravinoothala et al. |
| 2016/0344586 A1 | 11/2016 | Ganichev et al. |
| 2017/0005923 A1 | 1/2017 | Babakian |
| 2017/0048129 A1 | 2/2017 | Masurekar et al. |
| 2017/0048130 A1 | 2/2017 | Goliya et al. |
| 2017/0063632 A1 | 3/2017 | Goliya et al. |
| 2017/0063633 A1 | 3/2017 | Goliya et al. |
| 2017/0064717 A1 | 3/2017 | Filsfils et al. |
| 2017/0070425 A1 | 3/2017 | Mithyantha |
| 2017/0126497 A1 | 5/2017 | Dubey et al. |
| 2017/0180154 A1 | 6/2017 | Duong et al. |
| 2017/0230241 A1 | 8/2017 | Neginhal et al. |
| 2017/0288981 A1* | 10/2017 | Hong ................. H04L 41/0677 |
| 2017/0317919 A1 | 11/2017 | Fernando et al. |
| 2018/0006943 A1 | 1/2018 | Dubey |
| 2018/0062914 A1 | 3/2018 | Boutros et al. |
| 2018/0097734 A1 | 4/2018 | Boutros et al. |
| 2018/0367442 A1 | 12/2018 | Goliya et al. |
| 2019/0018701 A1 | 1/2019 | Dubey et al. |
| 2019/0020580 A1 | 1/2019 | Boutros et al. |
| 2019/0020600 A1 | 1/2019 | Zhang et al. |
| 2019/0109780 A1 | 4/2019 | Nagarkar |
| 2019/0124004 A1 | 4/2019 | Dubey |
| 2019/0190885 A1 | 6/2019 | Krug et al. |
| 2019/0199625 A1 | 6/2019 | Masurekar et al. |
| 2019/0245783 A1 | 8/2019 | Mithyantha |
| 2019/0281133 A1 | 9/2019 | Tomkins |
| 2019/0312812 A1 | 10/2019 | Boutros et al. |
| 2019/0334767 A1 | 10/2019 | Neginhal et al. |
| 2019/0372895 A1* | 12/2019 | Parthasarathy ......... H04L 45/16 |
| 2020/0021483 A1 | 1/2020 | Boutros et al. |
| 2020/0169496 A1 | 5/2020 | Goliya et al. |
| 2020/0186468 A1 | 6/2020 | Basavaraj et al. |
| 2020/0220802 A1 | 7/2020 | Goliya et al. |
| 2020/0267095 A1 | 8/2020 | Zhang et al. |

FOREIGN PATENT DOCUMENTS

| | | |
|---|---|---|
| CN | 102780605 A | 11/2012 |
| CN | 103890751 A | 6/2014 |
| CN | 103947164 A | 7/2014 |
| CN | 104335553 A | 2/2015 |
| CN | 105791412 A | 7/2016 |
| EP | 1653688 A1 | 5/2006 |
| EP | 2838244 A2 | 2/2015 |
| EP | 3013006 A1 | 4/2016 |
| JP | 2000244567 A | 9/2000 |
| JP | 2003069609 A | 3/2003 |
| JP | 2003124976 A | 4/2003 |
| JP | 2003318949 A | 11/2003 |
| JP | 2004134967 A | 4/2004 |
| JP | 2011139299 A | 7/2011 |
| JP | 2011228864 A | 11/2011 |
| JP | 2014534789 A | 12/2014 |
| KR | 1020110099579 A | 9/2011 |
| WO | 2005112390 A1 | 11/2005 |
| WO | 2008095010 A1 | 8/2008 |
| WO | 2013020126 A1 | 2/2013 |
| WO | 2013026049 A1 | 2/2013 |
| WO | 2013055697 A1 | 4/2013 |
| WO | 2013081962 A1 | 6/2013 |
| WO | 2013143611 A1 | 10/2013 |
| WO | 2013184846 A1 | 12/2013 |
| WO | 2015015787 A1 | 2/2015 |
| WO | 2015142404 A1 | 9/2015 |
| WO | 2016123550 A1 | 8/2016 |
| WO | 2017027073 A1 | 2/2017 |
| WO | 2018044746 A1 | 3/2018 |

OTHER PUBLICATIONS

Non-Published commonly Owned U.S. Appl. No. 16/506,782, filed Jul. 9, 2019, 91 pages, Nicira, Inc.

Author Unknown, "Cisco Border Gateway Protocol Control Plane for Virtual Extensible LAN," White Paper, Jan. 23, 2015, 6 pages, Cisco Systems, Inc.

Author Unknown, "Cisco Data Center Spine-and-Leaf Architecture: Design Overview," White Paper, Apr. 15, 2016, 27 pages, Cisco Systems, Inc.

Moreno, Victor, "VXLAN Deployment Models—A Practical Perspective," Cisco Live 2015 Melbourne, Mar. 6, 2015, 72 pages, BRKDCT-2404, Cisco Systems, Inc.

Non-published commonly owned U.S. Appl. No. 16/581,118 (N310.C1), filed Sep. 24, 2019, 36 pages, Nicira, Inc.

Non-published commonly owned U.S. Appl. No. 16/823,050 (N201.01.C2), filed Mar. 18, 2020, 79 pages, Nicira, Inc.

Non-published commonly owned U.S. Appl. No. 16/868,524 (N182.02.C2), filed May 6, 2020, 105 pages, Nicira, Inc.

Agarwal, Sugam, et al., "Traffic Engineering in Software Defined Networks," 2013 Proceedings IEEE INFOCOM, Apr. 14, 2013, 10 pages, Bell Labs, Alcatel-Lucent, Holmdel, NJ, USA.

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.

Author Unknown, "Defining Security Policies for Policy-based and Route-based VPNs," Month Unknown 2018, 5 pages, Fortinet, Inc., retrieved at http://help.fortinet.com/fos50hlp/54/Content/FortiOS/fortigate-ipsecvpn-54/Defining_VPN_Policies/Defining_Policies_for Policy_and_Route.htm.

Author Unknown, "VMware® NSX Network Virtualization Design Guide," Month Unknown 2013, 32 pages, Item No. VMW-NSX-NTWK-VIRT-DESN-GUIDE-V2-101, VMware, Inc., Palo Alto, CA, USA.

Ballani, Hitesh, et al., "Making Routers Last Longer with ViAggre," NSDI '09: 6th USENIX Symposium on Networked Systems Design and Implementation, Apr. 2009, 14 pages, USENIX Association.

Caesar, Matthew, et al., "Design and Implementation of a Routing Control Platform," NSDI '05: 2nd Symposium on Networked Systems Design & Implementation , Apr. 2005, 14 pages, Usenix Association.

Dumitriu, Dan Mihai, et al., (U.S. Appl. No. 61/514,990), filed Aug. 4, 2011.

Fernando, Rex, et al., "Service Chaining using Virtual Networks with BGP," Internet Engineering Task Force, IETF, Jul. 7, 2015, 32

(56) References Cited

OTHER PUBLICATIONS pages, Internet Society (ISOC), Geneva, Switzerland, available at https://tools.ietf.org/html/draft-fm-bess-service-chaining-01.

Handley, Mark, et al., "Designing Extensible IP Router Software," Proc. of NSDI, May 2005, 14 pages.

Koponen, Teemu, et al., "Network Virtualization in Multi-tenant Datacenters," Technical Report TR-2013-001E, Aug. 2013, 22 pages, VMware, Inc., Palo Alto, CA, USA.

Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.

Lowe, Scott, "Learning LSX, Part 14: Using Logical Routing," Scott's Weblog: The weblog of an IT pro specializing in cloud computing, virtualization, and networking, all with an open source view, Jun. 20, 2014, 8 pages, available at https://blog.scottlowe.org/2014/06/20/learning-nsx-part-14-using-logical-routing/.

Maltz, David A., "Routing Design in Operational Networks: A Look from the Inside," SIGCOMM '04, Aug. 30-Sep. 3, 2004, 14 pages, ACM, Portland, Oregon, USA.

Non-Published commonly owned U.S. Appl. No. 16/210,410, filed Dec. 5, 2018, 29 pages, VMware, Inc.

Non-Published Commonly Owned U.S. Appl. No. 16/216,936 (N281.C1), filed Dec. 11, 2018, 47 pages, Nicira, Inc.

Rosen, E., "Applicability Statement for BGP/MPLS IP Virtual Private Networks (VPNs)," RFC 4365, Feb. 2006, 32 pages, The Internet Society.

Sajassi, Ali, et al., "Integrated Routing and Bridging in EVPN draft-sajassi-l2vpn-evpn-inter-subnet-forwarding-04", Jul. 4, 2014, 24 pages.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 15, 2013, 15 pages, IEEE.

Wang, Yi, et al., "Virtual Routers on the Move: Live Router Migration as a Network-Management Primitive," SIGCOMM '08, Aug. 17-22, 2008, 12 pages, ACM, Seattle, Washington, USA.

Wang, Yushun, et al., "Connect Azure VPN gateways to multiple on-premises policy-based VPN devices using PowerShell," VPN Gateway Documentation, Apr. 18, 2018, 5 pages, retrieved at https://docs.microsoft.com/en-us/azure/vpn-gateway/vpn-gateway-connect-multiple-policybased-rm-ps.

Non-published commonly owned U.S. Appl. No. 16/945,910 (N281.C2), filed Aug. 2, 2020, 46 pages, Nicira, Inc.

Non-Published commonly owned U.S. Appl. No. 17/062,531 (N242.C2), filed Oct. 2, 2020, 75 pages, Nicira, Inc.

Non-published commonly owned U.S. Appl. No. 17/068,588 (N179.01.C1), filed Oct. 12, 2020, 75 pages, Nicira, Inc.

* cited by examiner

Policy-Based IPSec Rules 10.0.0.0/28 to 10.0.1.0/24 protect
10.0.2.0/28 to 10.0.3.0/28 protect
11.0.0.0/24 to 12.0.0.0/24 clear

500

SR Routing Table 0.0.0.0/0 output to Virtual Tunnel I/F
10.0.1.0/24 output to Uplink1
10.0.3.0/28 output to Uplink1
12.0.0.0/24 output to Uplink1

505

STATIC ROUTES FOR POLICY-BASED VPN

BACKGROUND

Virtual private networks (VPNs) are often used to protect data traffic that traverses public networks (e.g., the Internet) between datacenters (e.g., enterprise datacenters, branch offices, public cloud datacenters, etc.). These VPNs often use Internet Protocol Security (IPsec) or other security protocols in order to securely encrypt the data traffic before it leaves the source datacenter. In certain cases, a logical network implemented in one datacenter will send secure traffic to multiple other datacenters (e.g., on-premises enterprise datacenters, branch offices, virtual private clouds in public clouds, etc.), using multiple separate VPNs. To ensure that this traffic is protected and sent to the correct destination datacenter, techniques are required to avoid any potential conflicts between the multiple VPNs in use.

BRIEF SUMMARY

Some embodiments provide a gateway datapath for a logical network that uses static routes to route data messages with destination addresses governed by security protocol rules to an interface at which the security protocol rules are applied. By using these static routes, the gateway datapath implements both route-based virtual private networks (VPNs) as well as policy-based VPNs without conflict. To configure the gateway datapath, in some embodiments a network controller (e.g., a local controller executing on the same host computer as the gateway datapath) receives policy-based VPN rules (i.e., rules based on more criteria than just destination addresses) and generates the static routes for the gateway datapath based on the policy-based VPN rules.

The gateway datapath, in some embodiments, processes data messages between a logical network implemented in a datacenter and networks external to the logical network. These external networks may include public networks (e.g., for communication from public client machines through the Internet), as well as other datacenters to which the gateway datapath securely tunnels traffic via a VPN using a security protocol (e.g., IPsec). A logical network implemented in a first enterprise datacenter might be connected (via separate VPNs) to, e.g., one or more networks in public multi-tenant datacenters, one or more branch offices, etc.

Based on the configuration, these multiple VPNs might include both traditional policy-based VPNs as well as route-based VPNs. For a policy-based VPN, the gateway datapath applies security policy rules that indicate whether to encrypt data messages based on any number of criteria (e.g., source and/or destination network address, source and/or destination transport layer port number, etc.). In some embodiments, these security protocol rules are applied by the gateway datapath in a separate stage of processing after the data messages have been routed to a particular interface to which the rules apply. That is, the set of rules for a particular policy-based VPN are applied only to traffic that has been routed to the interface for which the VPN rules are configured.

To implement a route-based VPN, typically a separate interface (e.g., a virtual interface) is created for the VPN and the gateway datapath encrypts all traffic sent through that interface. To route traffic to the virtual interface, routes (i.e., based exclusively on the destination network address) are configured for the routing table used by the gateway datapath directing the appropriate traffic to that interface. In many cases, a default route will be installed in the routing table such that all routes not meeting a higher-priority route are routed to the virtual interface for the VPN. This default route could be configured based on administrator input (e.g., to a network management and control system for the datacenter) or based on a gateway on the other end of the VPN connection advertising the default route in order to attract data traffic from the logical network.

However, because the gateway datapath executes the routing stage prior to the security protocol stage for outgoing data messages, then a data message that should be processed according to the security protocol rules of a policy-based VPN will be routed to the virtual interface for the route-based VPN based on the default route and securely transmitted to the wrong destination. These data messages will either be dropped at the destination or routed in a loop (and eventually dropped).

Thus, some embodiments generate static routes for each applicable security policy rule of the policy-based VPN based on a destination address (or group of addresses) for which the rule specifies a security policy. For instance, if the security policy for a particular policy-based VPN specifies that all data from IP0 to IP2 is to be encrypted (where IP1 and IP2 may be prefixes that cover a range of IP addresses), some embodiments generate a static route that routes data messages sent to IP2 to the logical router interface for which the security policy rules are applied. This way, at the security protocol stage, the gateway datapath can then apply the security policy rules and encrypt the data message if required.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a gateway datapath for a logical network that uses static routes to route data messages with destination addresses governed by security protocol rules to an interface at which the security protocol rules are applied. By using these static routes, the gateway datapath implements both route-based virtual private networks (VPNs) as well as policy-based VPNs without conflict. To configure the gateway datapath, in some embodiments a network controller (e.g., a local controller executing on the same host computer as the gateway datapath) receives policy-based VPN rules (i.e., rules based on more criteria than just destination addresses) and generates the static routes for the gateway datapath based on the policy-based VPN rules.

The gateway datapath, in some embodiments, processes data messages between a logical network implemented in a datacenter and networks external to the logical network. These external networks may include public networks (e.g., for communication from public client machines through the Internet), as well as other datacenters to which the gateway datapath securely tunnels traffic via a VPN using a security protocol (e.g., IPsec). A logical network implemented in a first enterprise datacenter might be connected (via separate VPNs) to, e.g., one or more networks in public multi-tenant datacenters, one or more branch offices, etc.

Figure 1:
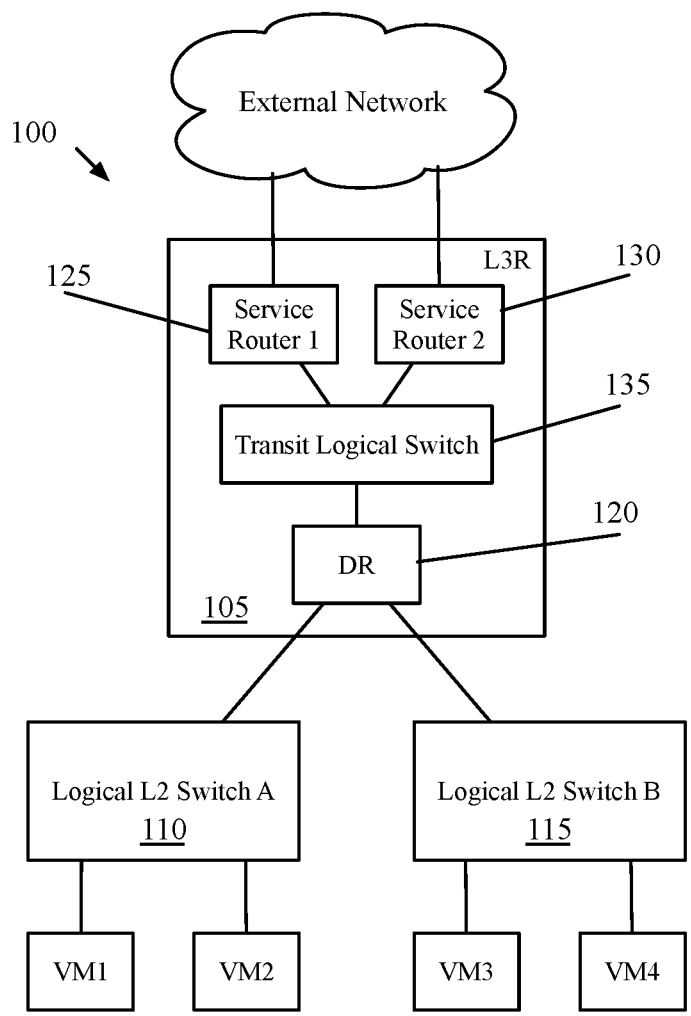
FIG. 1 conceptually illustrates an example of a logical network that might be implemented in a datacenter of some embodiments.

FIG. 1 conceptually illustrates an example of such a logical network 100 that might be implemented in a datacenter of some embodiments. As shown, the logical network 100 includes a logical router 105 and two logical switches 110 and 115. Two logical network endpoints (in this case, virtual machines) connect to each of the logical switches 110 and 115. In some embodiments, this logical network is configured by an administrator (e.g., an administrator of the datacenter in which the logical network is implemented, a tenant of the datacenter, etc.). The administrator configures these logical forwarding elements 105-115 by defining logical ports of the logical forwarding elements (e.g., the logical switch ports to which the VMs connect, the logical switch ports that connect to the logical router and corresponding logical router ports, uplink ports of the logical router that connect to external networks, etc.), configuring policies for the logical forwarding elements, etc.

As shown, the logical router 105 is defined to include multiple routing components 120-130 connected by a transit logical switch 135. These routing components include a distributed routing component (also referred to as a distributed router, or DR) 120 as well as multiple centralized routing components (also referred to as service routers, or SRs) 125 and 130. In some embodiments, a network management and control system receives the administrator configuration of the logical network and defines these routing components for the logical router 105. Each of the routing components 120-130 has a separate set of interfaces as well as a separate routing table. The DR 120 includes one northbound interface to the transit logical switch 135 to forward data messages to the SRs 125 and 130, which each include one southbound interface to the transit logical switch 135. In addition, the DR includes one southbound interface for each logical switch connected to the logical router 105 (as well as a southbound interface for any additional logical routers that connect to the logical router 105). The SRs 125 each include one or more uplink interfaces corresponding to uplinks configured by the administrator for the logical router 105 in some embodiments.

The logical forwarding elements 105-115 are implemented within the datacenter by physical managed forwarding elements of the datacenter (e.g., software forwarding elements such as virtual switches, etc.). In some embodiments, the logical switches 110 and 115 as well as the DR 120 (and the transit logical switch 135) are implemented in a distributed manner by numerous managed forwarding elements. That is, each of a set of the managed forwarding elements (MFEs) is configured (e.g., by the network management and control system) to perform processing on data messages according to the configuration of these logical forwarding elements. In some embodiments that use first-hop processing, and MFE executing on a host machine that hosts a logical network VM will receive a data message transmitted by that VM and perform logical processing for all (or many) of the distributed logical forwarding elements. For instance, the MFE receiving a data message sent by VM1 to an external endpoint would process the data message according to the logical switch 110, the DR 120, and the transit logical switch 135. In some embodiments, the SRs are each implemented centrally by a single host machine, and thus the MFE would transmit the data message to one of these SRs (based on the DR routing table).

The SRs 125 and 130 operate as gateways between the logical network 100 and external networks, such that all data messages between the endpoints of the logical network 100 and endpoints external to the logical network are processed by one of the SRs. These external networks may include public networks such as the Internet (via which client devices send data messages to and receive data messages from the VMs of the logical network) as well as other datacenters. In some cases, the SRs also implement stateful services for the logical network (e.g., a stateful firewall, load balancer, etc.). In different embodiments, the SRs may be implemented by a virtual machine or other data compute node, an MFE that also implements the other logical forwarding elements (e.g., a DPDK-based datapath), or another context.

It should be understood that this is a simplistic example of a logical network, and many logical networks include numerous virtual machines or other types of endpoints, additional logical switches, multiple tiers of logical routers, etc. For example, in some embodiments the logical router 105 that includes SRs connecting to external networks is a first tier of logical router managed by a datacenter administrator, and several different logical routers of a second tier (e.g., for different tenant logical networks that are managed by different tenant administrators) connect to this first-tier logical router.

Figure 2:
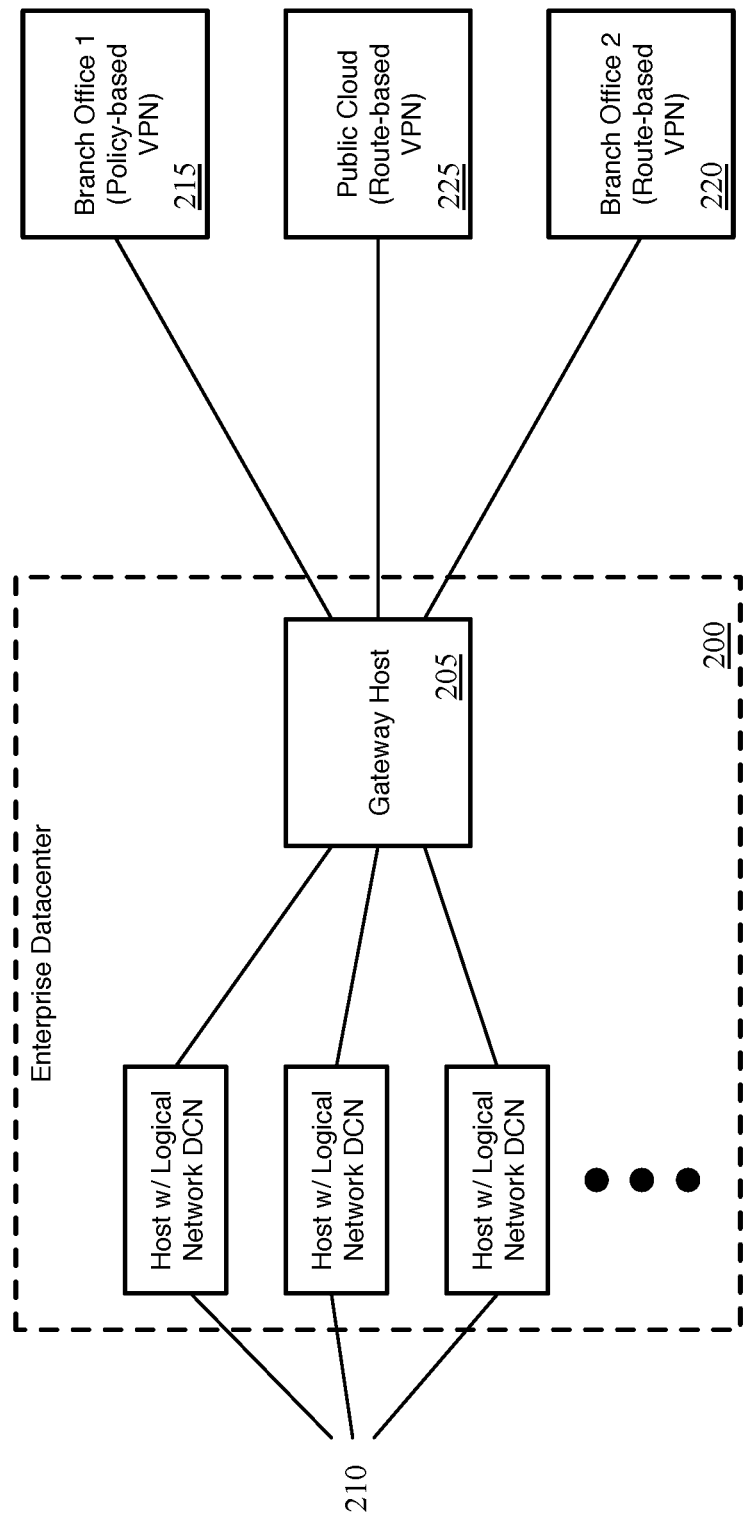
FIG. 2 conceptually illustrates a first enterprise datacenter in which one or more logical networks are implemented, as well as several additional datacenters that connect to this logical network via VPNs.

FIG. 2 conceptually illustrates a first enterprise datacenter 200 in which one or more logical networks (such as the logical network 100) are implemented, as well as several additional datacenters that connect to this logical network via VPNs. As shown, the enterprise datacenter 200 includes several host machines, including a gateway host 205 and multiple additional host machines 210 that host logical network data compute nodes (DCNs), such as VMs. In some embodiments, the gateway host 205 implements an SR for a logical network (e.g., one of the SRs 125 and 130), while the VMs of that logical network execute on the hosts 210. In addition, MFEs executing on the hosts 210 as well as the gateway host 205 would implement the other (distributed) logical forwarding elements of the logical network, such as the logical switches 110, 115, and 135 as well as the DR 120). The enterprise datacenter 200 of some embodiments also includes additional gateway hosts for hosting other SRs of the same logical router or of additional logical networks.

The gateway host 205 connects the logical network endpoints executing on the host computers 210 of the datacenter to first and second branch offices 215 and 220 as well as a network in a public cloud 225. In some embodiments, these connections are configured the logical network administrator as VPN connections between the logical router (and thus an SR) and the different networks 215-225. It should be understood that these are examples of the types of networks that might be connected, and different embodiments could have different configurations of datacenter networks (e.g., a gateway connecting to multiple public clouds, a gateway in a branch office connecting to multiple other datacenters, etc.).

In this example, the multiple VPNs that the gateway host 205 implements include both traditional policy-based VPNs as well as route-based VPNs. Specifically, the first branch office 215 uses a policy-based VPN while the second branch office 220 and the public cloud 225 use route-based VPNs. For a policy-based VPN, the administrator configures (and the gateway applies) a set of security policy rules that indicate whether to encrypt data messages based on any number of criteria (e.g., source and/or destination network address, source and/or destination transport layer port number, etc.).

To implement a route-based VPN, typically a separate interface (e.g., a virtual tunnel interface) is created for the VPN and the gateway encrypts all traffic sent through that interface. To route traffic to the virtual interface, routes (i.e., based exclusively on the destination network address) are configured for the SR routing table (used by the gateway) to direct the appropriate traffic to that interface. In some cases, one or more of the networks to which the logical network connects via a VPN will have a legacy system that only uses policy-based VPNs; however, other systems (e.g., a public cloud) might use route-based VPNs. Due to the manner in which the gateway processes outgoing data packets, this combination of different types of VPNs creates the possibility of conflict between the two.

Figure 3:
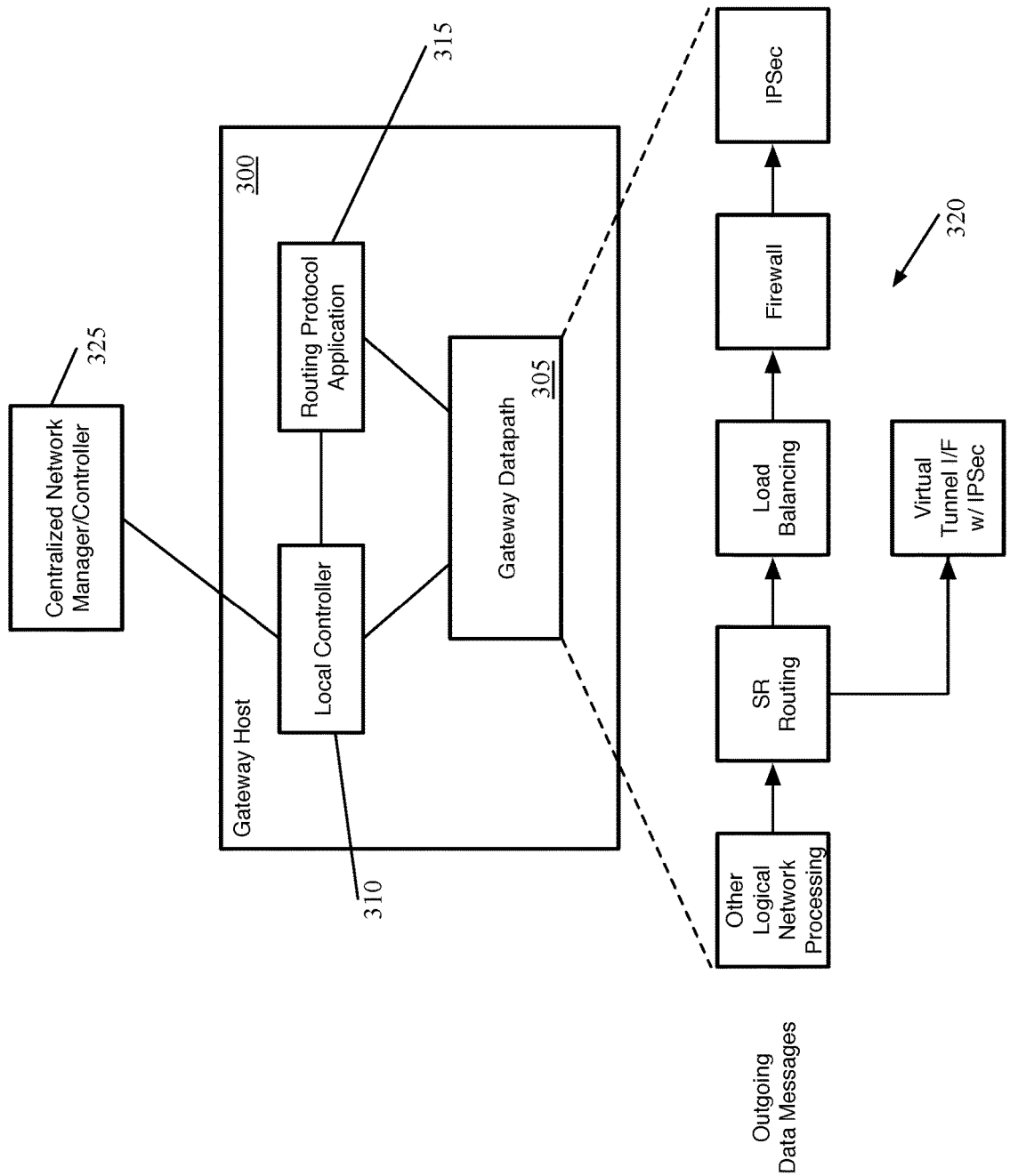
FIG. 3 conceptually illustrates the operation of a datapath on a gateway host computer.

FIG. 3 conceptually illustrates the operation of a datapath 305 on a gateway host computer 300. As shown, the gateway datapath 305, a local controller 310, and a routing protocol application 315 all execute on the gateway host 300. In some embodiments, some or all of these modules execute in virtualization software (e.g., a hypervisor) of the gateway host 300. The gateway datapath 305 handles the packet processing for data messages entering and exiting the datacenter through the gateway host 300 in some embodiments (e.g., data messages sent from this datacenter to another datacenter via VPN, data messages between external devices and logical network endpoints, etc.). In this example, the gateway datapath implements the SR as well as the other logical forwarding elements of one or more logical networks, though in other embodiments the SR is implemented by a separate entity on the gateway host (e.g., a VM or other DCN) than the MFE that implements the other logical forwarding elements.

The local controller 310 configures the gateway datapath 305 to implement the logical networks in some embodiments, including the SRs and the various stateful services that the administrator configures for those SRs. In some embodiments, the local controller 310 configures the gateway datapath 305 based on configuration data that the local controller receives from a centralized network manager and/or controller 325 of a network management and control system. This configuration data includes routes for the gateway datapath, security policy (e.g., IPSec) rules for policy-based VPNs, firewall and load balancer configurations, etc. Though shown as a single box, the central network manager/controller 325 may include separate management plane and central control plane functions in some embodiments, one or both of which may operate in clusters (rather than as a single machine).

In some embodiments, the SR exchanges routes with external routers to which its uplinks connect as well as gateways with route-based VPNs using a routing protocol such as Border Gateway Protocol (BGP) or Open Shortest Path First (OSPF). The routing protocol application 315 is configured to generate route advertisement messages to advertise routes for logical network addresses (e.g., for the subnets of the logical switches, for public virtual IP addresses, etc.) to external public network routers and/or to other datacenters (e.g., via the VPN connections). In addition, when the gateway datapath 305 receives a routing protocol message from one of these peers of the SR, the datapath provides this message to the routing protocol application 315. The routing protocol application identifies additional routes for the SR and provides these routes to the local controller 310, which can use the routes to modify the SR configuration for the datapath 305.

This figure also shows a set of processing stages 320 implemented by the gateway datapath 305 when processing outgoing data messages for a particular logical network. In some embodiments, the gateway datapath 305 handles data messages for multiple logical networks (and multiple SRs) that it implements, and may have a different set of stages for different logical networks (e.g., not all logical networks will necessarily use a load balancer stage, or have multiple VPN connections).

As shown, the gateway datapath 305 initially performs logical network processing to logically forward such an outgoing data message to the SR. In some embodiments, the majority of this logical processing would have previously been performed by the first-hop MFE at the source of the data message, and the only remaining logical network processing involves forwarding the data message to the southbound SR interface based on a previously-determined output port of a transit logical switch that connects the SRs and DR of the logical router.

Next, the gateway datapath routes the data message according to the SR routing table. The SR routing table, in some embodiments, includes routes for incoming data messages (e.g., to send such data messages to the DR), as well as static routes configured for outgoing data messages and routes learned from external routers or gateways on the other end of a VPN connection using a routing protocol (e.g., BGP or OSPF). These are the routes that the routing protocol application 315 receives via routing protocol messages and provides to the local controller 310 to be installed in the SR routing table. In some embodiments, outgoing messages may be routed either to an uplink interface of the SR (in which case various additional processing stages associated with that uplink will be applied) or to a virtual tunnel interface for a route-based VPN connection. The gateway datapath (or a separate module on the gateway host) automatically applies a security protocol (e.g., IPSec) to all data messages routed to the virtual tunnel interface, then encapsulates and transmits these data messages to the datacenter at the other end of the VPN connection.

Data messages that are not routed to the virtual tunnel interface are processed by additional stages of the gateway datapath (e.g., the stages associated with the SR uplink interface to which the data messages are routed). In this case, these stages include load balancing and firewall stages as well as a policy-based IPSec stage. The policy-based IPSec stage applies the policy rules for any policy-based VPNs associated with the uplink. Thus, the set of rules for a particular policy-based VPN are applied only to traffic that has been routed to the interface for which the policy-based VPN rules are configured.

In many cases, a default route (e.g., in CIDR IPV4 notation, a route for 0.0.0.0/0) will be installed in the SR routing table such that all routes not meeting a higher-priority route are routed to a virtual tunnel interface for a route-based VPN. This default route could be configured based on administrator input or based on a gateway on the other end of the VPN connection advertising the default route in order to attract traffic from the logical network.

However, because the gateway datapath 305 executes the SR routing stage prior to the IPSec stage for outgoing data messages (for incoming data messages, the order of the stages is reversed), then a data message that should be processed according to the security protocol rules of a policy-based VPN will be routed to the virtual tunnel interface for the route-based VPN based on the default route and securely transmitted to the wrong destination. These data messages will either be dropped at the destination or routed in a loop (and eventually dropped).

Thus, some embodiments generate static routes for each applicable security policy rule of the policy-based VPN based on a destination address (or group of addresses) for which the rule specifies a security policy. For instance, if the security policy for a particular policy-based VPN specifies that all data from IP1 to IP2 is to be encrypted (where IP1 and IP2 may be prefixes that cover a range of IP addresses), some embodiments generate a static route that routes data messages sent to IP2 to the logical router interface for which the security policy rules are applied. This way, at the security protocol stage, the gateway datapath can then apply the security policy rules and encrypt the data message if required.

Figure 4:
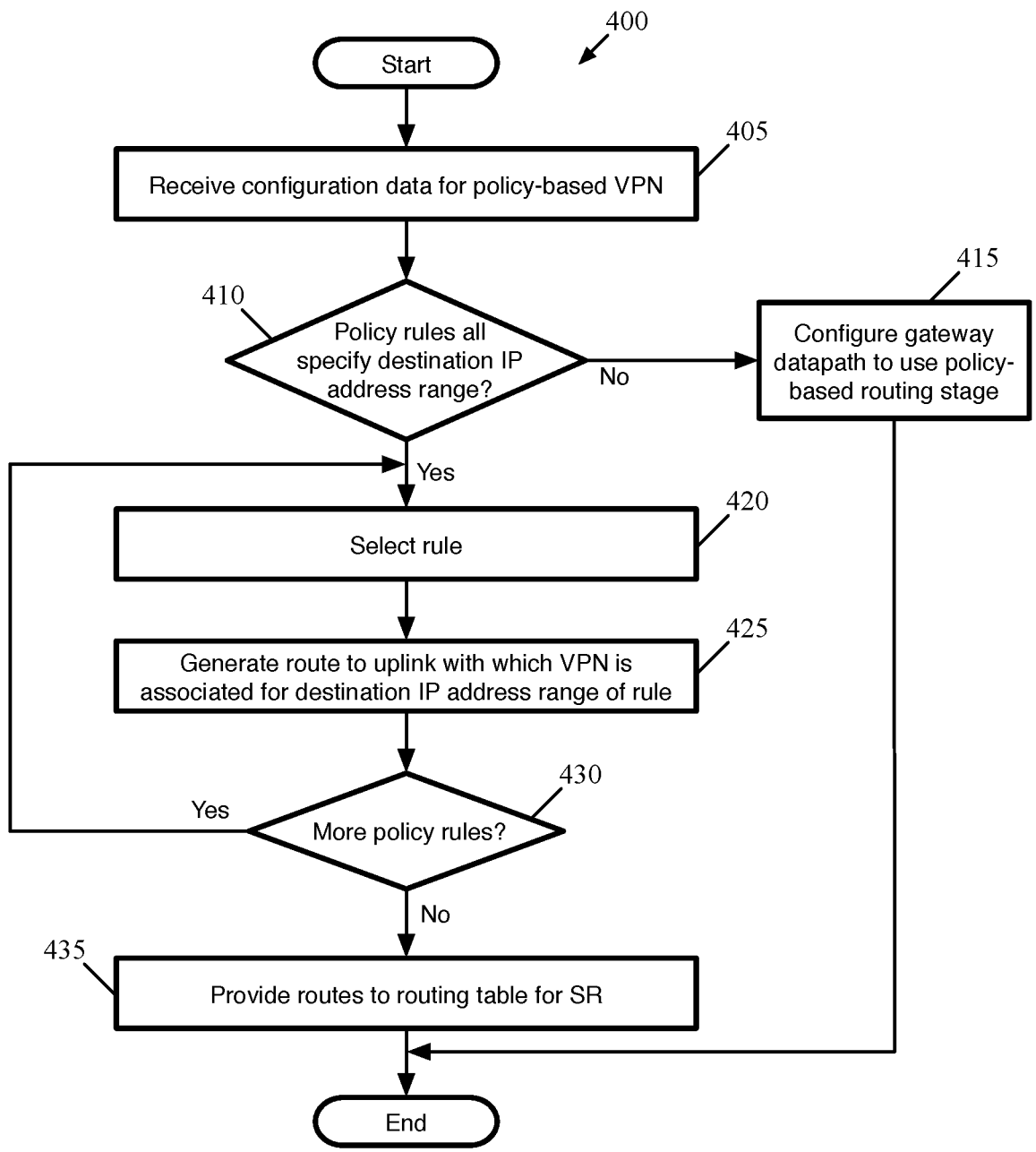
FIG. 4 conceptually illustrates a process for generating static routes for policy-based security protocol rules and inserting these static routes into the SR routing table.

FIG. 4 conceptually illustrates a process 400 for generating static routes for policy-based security protocol rules and inserting these static routes into the SR routing table. In some embodiments, the process 400 is performed by the local controller on the gateway at which the SR is implemented (e.g., the local controller 310), to configure the gateway datapath that implements the SR routing table. In other embodiments, the process 400 (or a similar process) is performed by a central network controller or manager (e.g., the centralized network manager/controller 325), which then provides the data (e.g., via the local controller) to the gateway datapath. The process 400 will be described in part by reference to FIG. 5, which illustrates an example of policy-based IPSec rules and the resultant static routes for those rules.

As shown, the process 400 begins by receiving (at 405) configuration data for a policy-based VPN through which a logical network sends and receives data traffic. In some embodiments, the process 400 is only performed when the logical network (and thus the SR) also sends and receives data traffic through at least one route-based VPN, thereby necessitating the injection of static routes for the policy-based VPN. The configuration data could be initial policy rules for the VPN or updates to the policy rules for the VPN. These policy rules, in some embodiments, specify one or more match conditions for data messages and whether to encrypt such data messages (and in some cases how to encrypt the data messages or references to data that specifies how to encrypt the data messages). The match conditions may include source and/or destination IP address ranges, source and/or destination transport layer port numbers, or other packet header fields.

Figure 5:
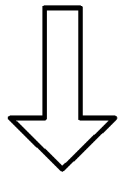
FIG. 5 illustrates an example of policy-based IPSec rules and the resultant static routes for those rules.

FIG. 5 illustrates an example set of such IPSec rules 500 for a policy-based VPN. These include two rules specifying to protect (encrypt) certain data messages, and one rule specifying to send other data messages unencrypted. Specifically, data messages with source IP addresses in the subnet 10.0.0.0/28 and destination IP addresses in the subnet 10.0.1.0/24 or with source IP addresses in the subnet 10.0.2.0/28 and destination IP addresses in the subnet 10.0.3.0/28 are to be encrypted. In addition, data messages with source IP addresses in the subnet 11.0.0.0/24 and destination IP addresses in the subnet 12.0.0.0/24 are to be sent unencrypted (but still encapsulated using the VPN tunnel headers so that the data message will reach the datacenter at the other end of the VPN connection).

Next, the process 400 determines (at 410) whether all of the policy rules specify a destination IP address range. In some embodiments, if a policy rule does not specify any destination IP address range (i.e., the rule applies to data messages with any destination IP address that also meet other criteria), then it is not possible to generate a non-default static route for the policy rule. Generating a default route would conflict with a default route for a route-based VPN and/or result in routing all traffic that does not match any higher-priority routes to the uplink interface.

As such, if the security policy rules include one or more rules that do not specify destination IP addresses, the process configures (at 415) the gateway datapath to use a policy-based routing stage. In some embodiments, the policy-based routing stage is performed prior to the SR routing stage for outgoing data messages, but after the other logical network processing has been applied (i.e., after a data message has been logically forwarded to the SR). The policy-based routing stage, in some embodiments, uses the policy-based VPN rules to forward data messages to the uplink interface with which the VPN is associated. While policy-based routing is another technique that avoids the conflict between default rules for route-based VPNs and the later application of policy-based VPN rules, applying policy-based rules is more resource- and time-intensive, and thus some embodiments only use a policy-based routing stage when the generation of static routes will not work because one or more of the policy-based rules does not limit the IP address range.

On the other hand, if all of the policy-based rules specify a destination IP address range, then the process 400 proceeds to generate static routes for the policy rules and provide these routes to the SR. As mentioned, the network management and control system (either the centralized manager and/or controller or the local controller on the gateway host computer) automatically generates these static routes and provides the routes to the SR without any additional user intervention (beyond the administrator providing the VPN policy rules).

Thus, the process 400 selects (at 420) one of the rules and generates (at 425) a route for the destination IP address range of the selected rule to the uplink with which the VPN is associated. FIG. 5 illustrates a subset of the SR routing table 505 that includes routes based on the policy-based IPSec rules 500. In addition to a first default route that routes data messages to a virtual tunnel interface for a route-based VPN, the illustrated portion of the SR routing table 505 includes routes based on each of the three policy rules 500. These routes specify that data messages in the IP address ranges 10.0.1.0/24, 10.0.3.0/28, and 12.0.0.0/24 should be output to a particular uplink interface of the SR (Uplink 1), with which this VPN is associated. As such, data messages with destination IP addresses in any of these subnets (and thus to which the policy-based security rules might apply) will be routed to this uplink rather than the virtual tunnel interface for the route-based VPN. After the intermediate service stages (e.g., load balancing, firewall) of the gateway datapath, the IPSec policy rules will be applied to these data messages to determine whether the data messages are sent over the VPN connection and whether they are encrypted.

The process 400 then determines (at 430) whether additional policy rules remain for which static routes need to be generated. If additional rules remain, the process 400 returns to 420 to select the next rule and generate a static route for that rule. Once all of the routes have been generated, the process provides (at 435) the routes to the routing table for the SR. In different embodiments, this entails having the local controller (or a different controller) performing route traversal including these new static routes in order to determine the actual forwarding information base (FIB) used by the gateway datapath to implement the SR, directly providing these routes to the configuration data used by the gateway datapath to implement the SR, or other mechanisms. The process 400 then ends. It should be understood that this is a conceptual process, and that the actual implementation of this process may deviate from the specific operations shown. For instance, some embodiments provide each route to the routing table as the route is generated rather than waiting for all of the static routes to be generated for the (potentially many) policy rules.

Figure 6:
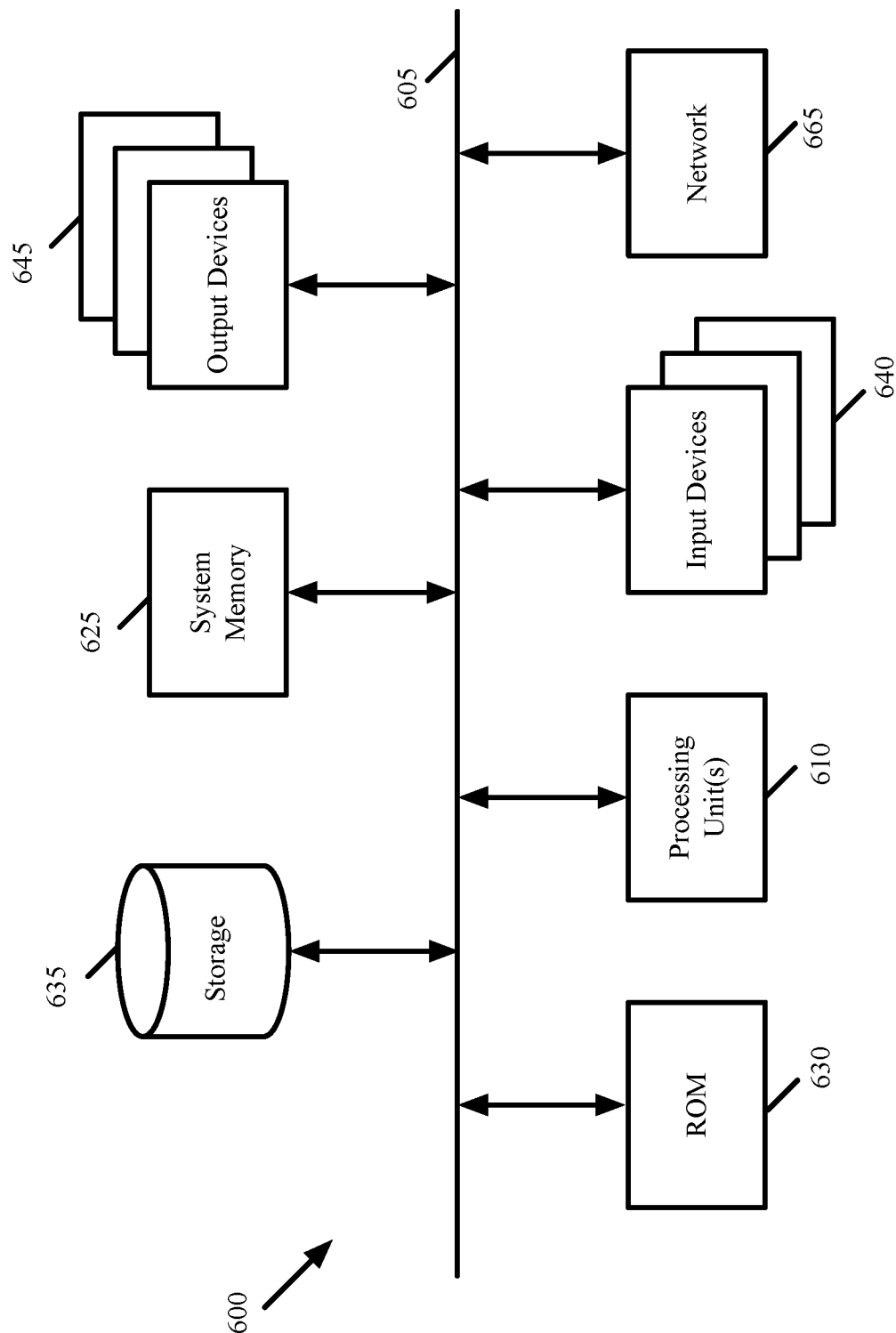
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random-access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring a gateway datapath that processes data messages between a logical network implemented in a datacenter and an external network, the method comprising:
   receiving configuration data comprising a set of security policy rules for a logical router implemented by the gateway datapath, the security policy rules indicating whether to apply a security protocol to certain data messages transmitted from a particular interface of the logical router;
   identifying a particular security policy rule in the set of security policy rules that applies to data messages that (i) have a destination address in a set of destination addresses and (ii) meet at least one additional criteria; and
   generating a static route, for a routing table used by the gateway datapath to implement the logical router, that routes data messages with destination addresses in the set of destination addresses to the particular interface, wherein the gateway datapath applies the set of security policy rules for data messages transmitted from the particular interface.

2. The method of claim 1, wherein the additional criteria comprises a data message having a source address in a set of source addresses.

3. The method of claim 1, wherein the additional criteria comprises a data message having at least one of a particular source port and a particular destination port.

4. The method of claim 1, wherein the static route routes data messages with destination addresses in the set of destination addresses irrespective of whether the data messages meet the additional criteria.

5. The method of claim 1, wherein the routing table further comprises a default route that routes data messages, that are not routed by a higher-priority route, to a tunnel interface that applies the security protocol to the data messages and sends the data messages to a particular destination.

6. The method of claim 5, wherein the particular destination is different from a destination for the data messages transmitted from the particular interface.

7. The method of claim 6, wherein the logical router comprises a plurality of interfaces corresponding to a plurality of different destinations.

8. The method of claim 7, wherein the logical network is implemented in a first datacenter and the plurality of different destinations comprises a set of additional datacenters.

9. The method of claim 5, wherein the gateway datapath performs routing for the logical router prior to applying any security policy rules to data messages.

10. The method of claim 1, wherein the security protocol is an encryption protocol for setting up a virtual private network (VPN).

11. The method of claim 10, wherein the encryption protocol is Internet Protocol Security (IPSec).

12. A non-transitory machine readable medium storing a program which when executed by at least one processing unit configures a gateway datapath that processes data messages between a logical network implemented in a datacenter and an external network, the program comprising sets of instructions for:
   receiving configuration data comprising a set of security policy rules for a logical router implemented by the gateway datapath, the security policy rules indicating whether to apply a security protocol to certain data messages transmitted from a particular interface of the logical router;

identifying a particular security policy rule in the set of security policy rules that applies to data messages that (i) have a destination address in a set of destination addresses and (ii) meet at least one additional criteria; and generating a static route, for a routing table used by the gateway datapath to implement the logical router, that routes data messages with destination addresses in the set of destination addresses to the particular interface, wherein the gateway datapath applies the set of security policy rules for data messages transmitted from the particular interface.

13. The non-transitory machine readable medium of claim 12, wherein the additional criteria comprises a data message having a source address in a set of source addresses.

14. The non-transitory machine readable medium of claim 12, wherein the additional criteria comprises a data message having at least one of a particular source port and a particular destination port.

15. The non-transitory machine readable medium of claim 12, wherein the static route routes data messages with destination addresses in the set of destination addresses irrespective of whether the data messages meet the additional criteria.

16. The non-transitory machine readable medium of claim 12, wherein the routing table further comprises a default route that routes data messages, that are not routed by a higher-priority route, to a tunnel interface that applies the security protocol to the data messages and sends the data messages to a particular destination.

17. The non-transitory machine readable medium of claim 16, wherein the particular destination is different from a destination for the data messages transmitted from the particular interface.

18. The non-transitory machine readable medium of claim 17, wherein the logical router comprises a plurality of interfaces corresponding to a plurality of different destinations.

19. The non-transitory machine readable medium of claim 18, wherein the logical network is implemented in a first datacenter and the plurality of different destinations comprises a set of additional datacenters.

20. The non-transitory machine readable medium of claim 16, wherein the gateway datapath performs routing for the logical router prior to applying any security policy rules to data messages.

* * * * *